United States Patent
Donderici et al.

(10) Patent No.: US 10,619,477 B2
(45) Date of Patent: Apr. 14, 2020

(54) USE OF CONDUCTIVE INK IN DOWNHOLE ELECTROMAGNETIC ANTENNA APPLICATIONS

(71) Applicant: Halliburton Energy Services, Inc., Houston, TX (US)

(72) Inventors: Burkay Donderici, Houston, TX (US); Ilker R. Capoglu, Houston, TX (US)

(73) Assignee: Halliburton Energy Services, Inc., Houston, TX (US)

(*) Notice: Subject to any disclaimer, the term of this patent is extended or adjusted under 35 U.S.C. 154(b) by 0 days.

(21) Appl. No.: 16/323,132

(22) PCT Filed: Sep. 21, 2016

(86) PCT No.: PCT/US2016/052907
§ 371 (c)(1),
(2) Date: Feb. 4, 2019

(87) PCT Pub. No.: WO2018/056969
PCT Pub. Date: Mar. 29, 2018

(65) Prior Publication Data
US 2019/0162064 A1 May 30, 2019

(51) Int. Cl.
*E21B 47/12* (2012.01)
*E21B 17/00* (2006.01)
(Continued)

(52) U.S. Cl.
CPC ............ *E21B 47/122* (2013.01); *C09D 11/52* (2013.01); *E21B 17/003* (2013.01); *E21B 47/02216* (2013.01); *G01V 3/30* (2013.01)

(58) Field of Classification Search
CPC ................. E21B 47/122; E21B 17/003; E21B 47/02216; C09D 11/52; G01V 3/30
(Continued)

(56) References Cited

U.S. PATENT DOCUMENTS 6,392,317 B1 * 5/2002 Hall .................. E21B 17/003
174/47
8,207,738 B2 6/2012 Wang
(Continued)

FOREIGN PATENT DOCUMENTS

WO 2014/089402 A2 6/2014
WO 2014/105084 A1 7/2014

OTHER PUBLICATIONS

Perelaer, Jolke, B-J. De Gans, and Ulrich S. Schubert. "Ink-jet printing and microwave sintering of conductive silver tracks." Advanced materials 18.16 (2006): 2101-2104.
(Continued)

*Primary Examiner* — Emily C Terrell
(74) *Attorney, Agent, or Firm* — John W. Wustenberg; Baker Botts L.L.P.

(57) ABSTRACT

The structural integrity and reliability of a downhole tool, mandrel, casing or other downhole component may be improved by implementation of a design and configuration that does not require several separate components to be coupled together. Conductive ink electromagnetic antennas may be painted on an insulating layer or sheet. The insulating layer or sheet is affixed to the downhole component. The conductive ink electromagnetic antennas mate to wiring of the mandrel via caps or caps and pins. The conductive ink electromagnetic antennas may be excited and downhole measurements received that are indicative of any number of downhole parameters or conditions. The conductive ink electromagnetic antennas may be painted in any shape, dimension or size necessary for a given operation.

32 Claims, 7 Drawing Sheets

(51) Int. Cl.
*G01V 3/30* (2006.01)
*C09D 11/52* (2014.01)
*E21B 47/022* (2012.01)

(58) Field of Classification Search
USPC ......... 340/854.6, 854.9, 855.1, 854.5, 854.4, 340/854.3
See application file for complete search history.

(56) References Cited

U.S. PATENT DOCUMENTS

| | | | |
|---|---|---|---|
| 2006/0103389 A1* | 5/2006 | Bespalov | E21B 47/0002 324/338 |
| 2006/0157277 A1* | 7/2006 | Bittar | E21B 7/04 175/26 |
| 2009/0025924 A1 | 1/2009 | He et al. | |
| 2010/0155138 A1 | 6/2010 | Kuckes | |
| 2010/0231220 A1 | 9/2010 | Alumbaugh et al. | |
| 2016/0103240 A1 | 4/2016 | Wu et al. | |
| 2016/0248143 A1* | 8/2016 | Hensarling | H01Q 1/04 |
| 2017/0114631 A1* | 4/2017 | Dighe | E21B 47/12 |

OTHER PUBLICATIONS

Huang, Daniel, et al. "Plastic-compatible low resistance printable gold nanoparticle conductors for flexible electronics." Journal of the electrochemical society 150.7 (2003): G412-G417.

Zheng, Yi, et al. "Direct desktop printed-circuits-on-paper flexible electronics." Scientific reports 3 (2013): 1786.

Gao, Yunxia, Haiyan Li, and Jing Liu. "Direct writing of flexible electronics through room temperature liquid metal ink." PLoS One 7.9 (2012): e45485.

Russo, Analisa, et al. "Pen-on-paper flexible electronics." Advanced materials 23.30 (2011): 3426-3430.

International Search Report and Written Opinion issued in related PCT Application No. PCT/US2016/052907 dated Jun. 20, 2017, 19 pages.

* cited by examiner

USE OF CONDUCTIVE INK IN DOWNHOLE ELECTROMAGNETIC ANTENNA APPLICATIONS

CROSS-REFERENCE TO RELATED APPLICATION

The present application is a U.S. National Stage Application of International Application No. PCT/US2016/052907 filed Sep. 21, 2016, which is incorporated herein by reference in its entirety for all purposes.

BACKGROUND

The present disclosure relates generally to well drilling operations and, more particularly, to using conductive ink as electromagnetic antennas in electromagnetic antenna applications.

Hydrocarbons, such as oil and gas, are commonly obtained from subterranean formations that may be located onshore or offshore. The development of subterranean operations and the processes involved in removing hydrocarbons from a subterranean formation are complex. Typically, subterranean operations involve a number of different steps such as, for example, drilling a wellbore at a desired well site, treating the wellbore to optimize production of hydrocarbons, and performing the necessary steps to produce and process the hydrocarbons from the subterranean formation.

Ranging tools are used to determine the position, direction and orientation of a conductive pipe (for example, a metallic casing) for a variety of applications. In certain instances, such as in a blowout, it may be necessary to intersect a first well, called a target well, with a second well, called a relief well. The second well may be drilled for the purpose of intersecting the target well, for example, to relieve pressure from the blowout well. In certain instances, such as a crowded oil field, it may be necessary to identify the location of multiple wells to avoid collision incidents. In certain instances, a ranging tool is used to drill a parallel well to an existing well, for example, in steam assist gravity drainage (SAGD) well structures. In certain instances, a ranging tool is used to track an underground drilling path using a current injected metallic pipe over the ground as a reference. Traditional electrode sources, for example, for a mandrel, require insulating gap subs in ranging tool designs to prevent the source and return electrodes from effectively being shorted. It can be difficult to maintain structural integrity and reliability of the ranging tool due to these insulating gap subs.

FIGURES

Some specific exemplary embodiments of the disclosure may be understood by referring, in part, to the following description and the accompanying drawings.

While embodiments of this disclosure have been depicted and described and are defined by reference to exemplary embodiments of the disclosure, such references do not imply a limitation on the disclosure, and no such limitation is to be inferred. The subject matter disclosed is capable of considerable modification, alteration, and equivalents in form and function, as will occur to those skilled in the pertinent art and having the benefit of this disclosure. The depicted and described embodiments of this disclosure are examples only, and not exhaustive of the scope of the disclosure.

DETAILED DESCRIPTION

The present disclosure relates generally to well drilling operations and, more particularly, to using conductive ink as electromagnetic antennas in electromagnetic antenna applications.

For purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, an information handling system may be a personal computer, a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communication with external devices as well as various input and output (I/O) devices, such as a keyboard, a mouse, and a video display. The information handling system may also include one or more buses operable to transmit communications between the various hardware components. The information handling system may also include one or more interface units capable of transmitting one or more signals to a controller, actuator, or like device.

For the purposes of this disclosure, computer-readable media may include any instrumentality or aggregation of instrumentalities that may retain data and/or instructions for a period of time. Computer-readable media may include, for example, without limitation, storage media such as a direct access storage device (for example, a hard disk drive or floppy disk drive), a sequential access storage device (for example, a tape disk drive), compact disk, CD-ROM, DVD, RAM, ROM, electrically erasable programmable read-only memory (EEPROM), and/or flash memory; as well as communications media such wires, optical fibers, microwaves, radio waves, and other electromagnetic and/or optical carriers; and/or any combination of the foregoing.

Illustrative embodiments of the present disclosure are described in detail herein. In the interest of clarity, not all features of an actual implementation may be described in this specification. It will of course be appreciated that in the development of any such actual embodiment, numerous implementation-specific decisions must be made to achieve the specific implementation goals, which will vary from one implementation to another. Moreover, it will be appreciated that such a development effort might be complex and time-consuming, but would nevertheless be a routine undertaking for those of ordinary skill in the art having the benefit of the present disclosure.

Throughout this disclosure, a reference numeral followed by an alphabetical character refers to a specific instance of an element and the reference numeral alone refers to the element generically or collectively. Thus, as an example (not shown in the drawings), widget "1a" refers to an instance of a widget class, which may be referred to collectively as widgets "1" and any one of which may be referred to generically as a widget "1". In the figures and the description, like numerals are intended to represent like elements.

To facilitate a better understanding of the present disclosure, the following examples of certain embodiments are given. In no way should the following examples be read to limit, or define, the scope of the disclosure. Embodiments of the present disclosure may be applicable to drilling operations that include but are not limited to target (such as an adjacent well) following, target intersecting, target locating, well twinning such as in SAGD (steam assist gravity drainage) well structures, drilling relief wells for blowout wells, river crossings, construction tunneling, as well as horizontal, vertical, deviated, multilateral, u-tube connection, intersection, bypass (drill around a mid-depth stuck fish and back into the well below), or otherwise nonlinear wellbores in any type of subterranean formation. Embodiments may be applicable to injection wells, and production wells, including natural resource production wells such as hydrogen sulfide, hydrocarbons or geothermal wells; as well as borehole construction for river crossing tunneling and other such tunneling boreholes for near surface construction purposes or borehole u-tube pipelines used for the transportation of fluids such as hydrocarbons. Embodiments described below with respect to one implementation are not intended to be limiting.

The terms "couple" or "couples" as used herein are intended to mean either an indirect or a direct connection. Thus, if a first device couples to a second device, that connection may be through a direct connection or through an indirect mechanical or electrical connection via other devices and connections. Similarly, the term "communicatively coupled" as used herein is intended to mean either a direct or an indirect communication connection. Such connection may be a wired or wireless connection such as, for example, Ethernet or local area network (LAN). Such wired and wireless connections are well known to those of ordinary skill in the art and will therefore not be discussed in detail herein. Thus, if a first device communicatively couples to a second device, that connection may be through a direct connection, or through an indirect communication connection via other devices and connections.

Modern petroleum drilling and production operations demand information relating to parameters and conditions downhole. Several methods exist for downhole information collection, including logging while drilling ("LWD") and measurement-while drilling ("MWD"). In LWD, data is typically collected during the drilling process, thereby avoiding any need to remove the drilling assembly to insert a wireline logging tool. LWD consequently allows the driller to make accurate real-time modifications or corrections to optimize performance while minimizing down time. MWD is the term for measuring conditions downhole concerning the movement and location of the drilling assembly while the drilling continues. LWD concentrates more on formation parameter measurement. While distinctions between MWD and LWD may exist, the terms MWD and LWD often are used interchangeably. For the purposes of this disclosure, the term LWD will be used with the understanding that this term encompasses both the collection of formation parameters and the collection of information relating to the movement and position of the drilling assembly. Formation parameter measurements may be galvanic or induction measurements which measure formation resistivity, or propagation measurements which measure dielectric constant. Arrays of transmitters or receivers are typically employed to collect diverse information from the environment There exist different approaches for obtaining current on the target pipe to perform ranging operations and for taking ranging measurements. In one approach, an electromagnetic antenna type source is used to induce current on the target pipe. This current then induces a secondary magnetic field which can be measured by the receivers on the ranging tool. Based on the strength of the magnetic field, location of the target well may be determined, for example. Alternatively, gradient of the magnetic field radiated by the target pipe in addition to the magnetic field itself may also be measured. By using a relationship between the magnetic field and its gradient, a ranging measurement may be made.

In existing ranging tools that use electromagnetic antenna excitation, electromagnetic antennas are located coupled to the downhole tool or mandrel which may alter the integrity or strength of the downhole tool or mandrel. This is an important consideration given the amount of stress on the downhole tool during drilling operations, for example, logging while drilling operations. If the electromagnetic antennas are located on an exterior surface of the downhole tool the transmit and return electromagnetic antennas would effectively be shorted necessitating the use of insulating gap subs which may also affect electrical connections producing difficulties in design and reduced reliability of the ranging tool. In one or more embodiments of the present disclosure conductive ink of an electromagnetic antenna (for example, a transmitter or a return) is painted, printed, affixed, adhered, applied, or any combination thereof on an insulated layer located on the exterior of the downhole tool. The insulated layer ensures that there is no direct coupling from the painted electromagnetic antennas to the downhole tool which may significantly reduce the currents on the downhole tool. Thus, effective downhole tool isolation is accomplished, comparable to that of a gap sub, with the cost of slightly larger diameter downhole tool due to the insulated layer but with the benefit that the structural strength and integrity and reliability of the downhole tool are improved.

Figure 1:
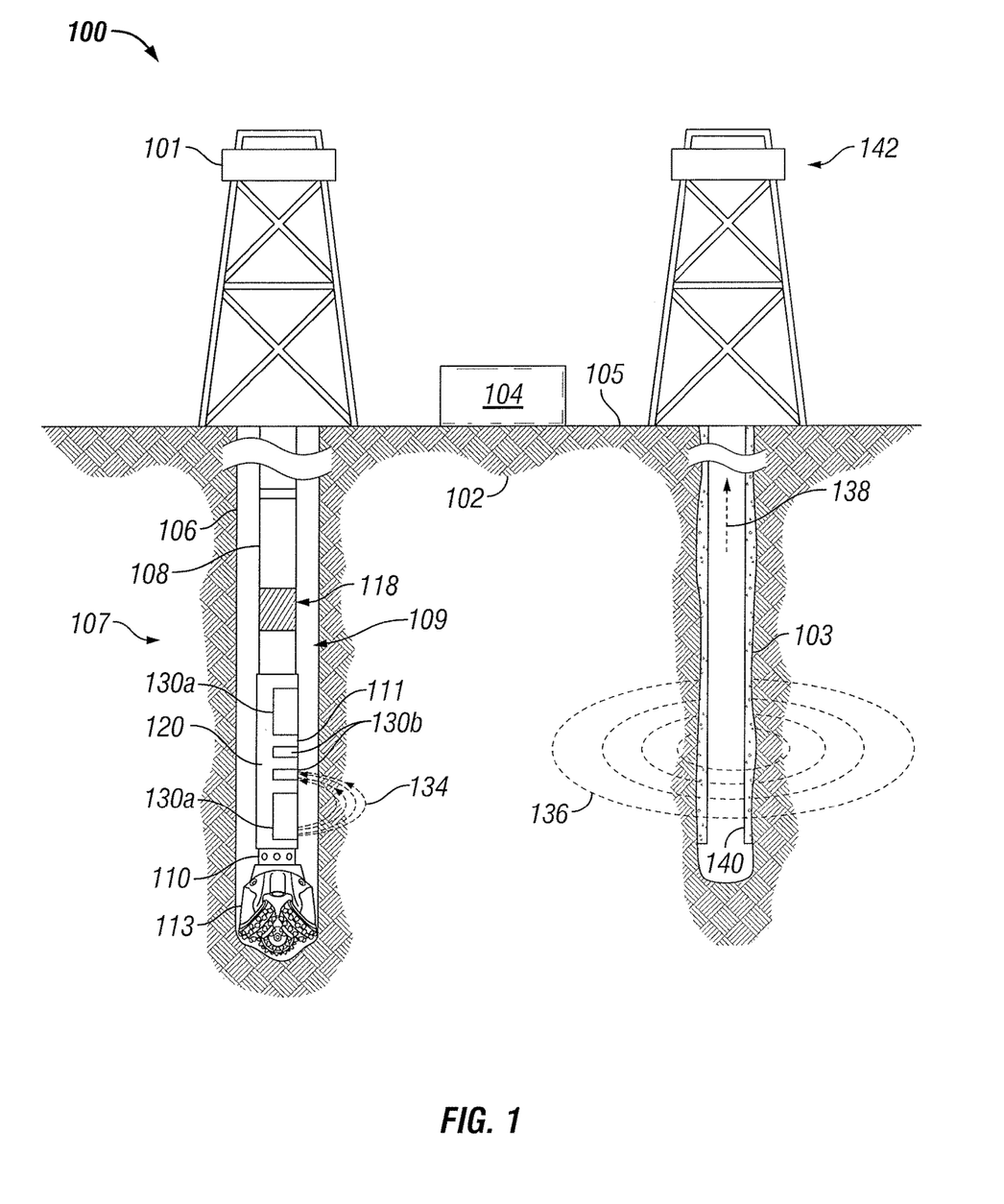
FIG. 1 is a diagram illustrating an example ranging system, according to aspects of the present disclosure.

FIG. 1 is a diagram illustrating an example drilling and ranging system environment 100, according to aspects of the present disclosure. The environment 100 includes rig 101 at the surface 105 and positioned above borehole 106 within a subterranean formation 102. Rig 101 may be coupled to a drilling assembly 107, comprising drill string 108 and bottom hole assembly (BHA) 109. The BHA 109 may comprise a drill bit 113 and a downhole tool 111. The downhole tool 111 may be any type of downhole tool 111 including, but not limited to, a MWD, an LWD, ranging tool, sensors, a galvanic tool, or any other suitable tool. In certain embodiments, the drilling assembly 107 may be rotated by a top drive mechanism (not shown) to rotate the drill bit 113 and extend the borehole 106. In certain other embodiments, a downhole motor (not shown), such as a mud motor, may be included to rotate the drill bit 113 and extend the borehole 106 without rotating the drilling assembly 107. In other embodiments, such as in an offshore drilling operation, the surface 105 may be separated from the rig 101 by a volume of water.

As used herein, a galvanic tool may comprise any tool with electromagnetic antennas through which current is injected into a subterranean formation and a voltage response of the formation to the injected current is measured and may be a subset of a ranging tool. As the bit extends the borehole 106 through the formation 102, the downhole tool 111 may collect resistivity measurements relating to borehole 106, the borehole 103 and the formation 102. In certain embodiments, the orientation and position of the downhole tool 111 may be tracked using, for example, an azimuthal orientation indicator, which may include magnetometers, inclinometers, and/or accelerometers, though other sensor types such as gyroscopes may be used in some embodiments.

Ranging operations may require that a location of a target object, for example, a conductive target, be identified. In the embodiment shown, the target object comprises a target well 142 for a second borehole 103. The borehole 103 may comprise a casing 140 containing or composed of an electrically conductive member such as casing, liner or a drill string or any portion thereof that has had a blowout or that needs to be intersected, followed, tracked or avoided. In the embodiment shown, the borehole 103 includes an electrically conductive casing 140. Identifying the location of the target well 142, with respect to the drilling well 101, with conductive casing 140 may comprise taking various measurements and determining a distance, direction and orientation of the target well 142 and borehole 103 relative to the borehole 106. These measurements may comprise measurements of electromagnetic fields in the formation using the electromagnetic antennas 130. Magnetic field measurements may identify the distance, orientation and direction to the target well 142.

Electromagnetic antennas 130 may be disposed, for example, printed, affixed, adhered, painted, applied, or any combination thereof, on the surface of an insulating layer 120 using conductive ink. The conductive ink may be based on silver nanoparticles, gold nanoparticles, liquid metal allows, or any other conductive ink known to one of ordinary skill in the art or any combination thereof. The conductive ink is generally a room-temperature conductive liquid with very high conductivity that may be applied to various surfaces or materials either by thermal processes (for example, annealing or sintering) or other printing and painting technologies. In one or more embodiments, the conductive ink may be applied so that the resulting electromagnetic antenna 130 has tapered edges. In one or more embodiments, the conductive ink may be applied uniformly. In one or more embodiments the conductive ink may be applied at a thickness of less than 0.3 millimeters (mm).

In certain embodiments, performing ranging measurements may include inducing an electromagnetic (EM) field within the second borehole 103 based, at least in part, on a formation current 134 injected into the formation 102. In the embodiment shown, inducing a magnetic field within the borehole 106 comprises injecting a formation current 134 into the formation 102 by exciting a transmitter 130*a* and returning at return 130*b* where the electromagnetic antennas 130 are coupled to, attached to, or located on an insulating layer 120. The source of the excitation may be a voltage or a current. Part of the induced formation current 134 may be received and concentrated at the casing 140 within the target well 142, shown as current 138, and the current 138 on the casing 140 may induce a magnetic field 136 in a radial direction from the direction of the flow of the electric current 138. Formation current 134 may be induced within the formation 102 by energizing the transmitter 130*a* of the drilling assembly 107 according to a control signal that specifies signal characteristics for the formation current 134. The formation current 134 may comprise, for example, an alternating current electrical signal. Part of the induced formation current 134 may be received and concentrated at the casing 140 within the target well 142, shown as current 138, and the current 138 on the casing 140 may induce a magnetic field 136 in a radial direction from the direction of the flow of the electric current 138. A magnetic field 136 created by the target object or target well 142 may be proportional to the current flowing into the formation.

Figure 4A:
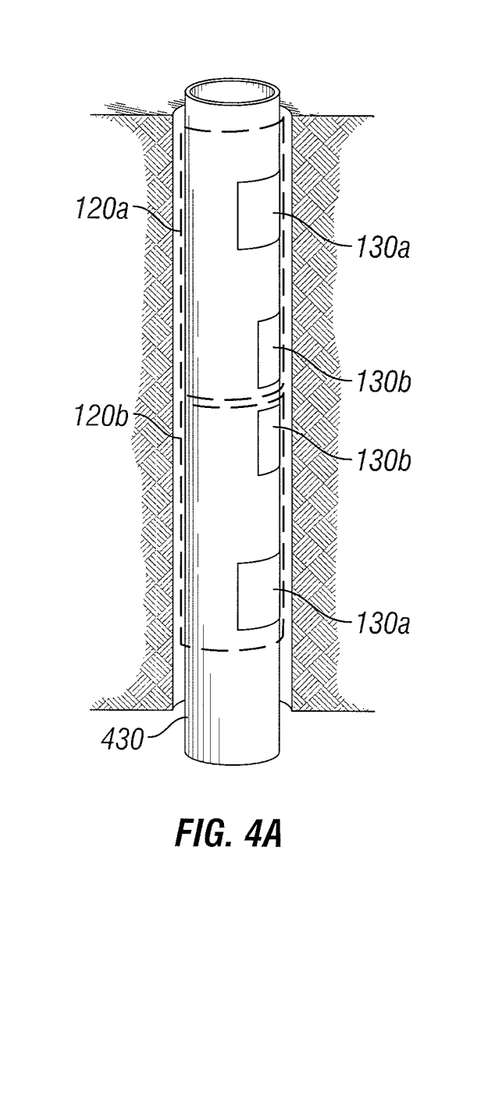
FIGS. 4A, 4B, and 4C are diagrams illustrating example electromagnetic antenna excitation systems, according to aspects of the present disclosure.

In particular, the drilling assembly 107 includes an insulating layer 120 that may allow for a dipole electric field to be created to aid in flowing or drawing current into the formation 102. The insulating layer 120, such as an insulating sleeve, may wrap around portions of the downhole tool 111. In any embodiment, the insulating layer 120 may wrap around a top portion of the downhole tool 111 and/or a bottom portion of the downhole tool 111. In other embodiments, the insulating layer 120 may be included on the exterior or outer surface of any downhole tool, mandrel, LWD, MWD, BHA 109, or any other component or element of drill string 108. Insulating layer 120 may surround the entire circumference or a portion of the downhole tool 111. In one or more embodiments, insulating layer 120 may be sheet of material wrapped onto the surface of the supporting structure, such as wrapped around the downhole tool 111. In one or more embodiments, the conductive ink of electromagnetic antennas 130 is painted on the insulating layer 120 prior to installation of the insulating layer on the downhole tool 110 or any other surface for a given operation (for example, the casing as illustrated in FIG. 4A). Electromagnetic antennas 130 may be located on or attached to the insulating layer 120. Electromagnetic antennas 130 may be positioned at various locations along an insulating layer 120. Electromagnetic antennas 130 may comprise any one or more of a transmitter 130*a* located at an insulating layer 120*a* and a return 130*b* located at an insulating layer 120*b*. The electromagnetic antenna 130 may be a solenoid electrode, ring electrode, patch electrode, or any other type of suitable antenna. The insulating layer 120 electrically isolates the electromagnetic antennas 130 from downhole tool 111. The insulating layer 120 and the electromagnetic antennas 130 may be located at any location along the drilling assembly 107 according to a given operation.

In one or more embodiments, the electromagnetic antenna 130 may be a transmitter for a receiver or a receiver for a transmitter. For example, the transmitter 130*a* may comprise an antenna and the formation current 134 may comprise a time-varying magnetic field that is emitted from the transmitter 130*a*. The one or more receivers 110 may comprise but are not limited to an induction type sensor, a Hall Effect magnetometer sensor, a magnetic gradiometer or a combination or pair of any of the magnetometers listed above or any other type of sensor or combination of sensors known to one of ordinary skill in the art. Likewise, the one or more receivers 110 may be uniaxial, biaxial, or triaxial, and also may be a flux-gate, solenoid, or coil type sensor. In one or more embodiments, a receiver 110 may be conductive ink that may also be disposed at any location on the downhole tool 111.

In certain embodiments, an insulating layer 120 and corresponding attached electromagnetic antenna 130 may be positioned at various locations along the BHA 109, or above the BHA 109, such as between the drill string 108 and the BHA 109. The orientation of the electromagnetic antennas 130 may be reversed, for example, the transmitter 130a may be located closer to the drill bit 113 or closer to the surface 105 in relation to the return 130b. It may be advantageous to position the electromagnetic antennas 130 as close to the bottom of the borehole 106 as possible. It may be advantageous to locate the transmitter 130a and return 130b as far apart as possible or to locate the transmitter 130a and return 130b within a predefined range.

A hole in the insulating layer 120a and the downhole tool 111 or any other part of the BHA 109 or drilling assembly 107 may be utilized to permit a wire (not shown) to couple to the transmitter 130a to excite (for example, direct the formation current 134) the transmitter 130a. In any embodiment, the transmitter 130a may be located on the order of 10-200 feet (or on the order of 3.048-60.96 meters) from the return 130b or at any range greater, lesser or in between.

In certain embodiments, a system control unit 104 may be positioned at the surface 105 as depicted in FIG. 1 and may be communicably or communicatively coupled to downhole elements including, but not limited to, drilling assembly 107, telemetry system 118, downhole tool 111, and BHA 109. In other embodiments, a system control unit 104 may be positioned below the surface 105 (not shown) and may communicate data to another system control unit 104 or any other system capable of receiving data from the system control unit 104. For example, the control unit 104 may be communicably coupled to the downhole tool 111, electromagnetic antennas 130, drill bit 113, or any other component through a telemetry system 118. The telemetry system 118 may be incorporated into the BHA 109 or any other downhole component of drilling assembly 107 and may comprise a mud pulse type telemetry system that transmits information between the surface system control unit 104 and downhole elements via pressure pulses in drilling mud. Although the system control unit 104 is positioned at the surface 105 in FIG. 1, certain processing, memory, and control elements may be positioned within the drilling assembly 107. Additionally, various other communication schemes may be used to transmit communications to/from the system control unit 104, including wireline configurations and wireless configurations.

In certain embodiments, the system control unit 104 may comprise an information handling system with at least a processor and a memory device coupled to the processor that contains a set of instructions that when executed cause the processor to perform certain actions. In any embodiment, the information handling system may include a non-transitory computer readable medium that stores one or more instructions where the one or more instructions when executed cause the processor to perform certain actions. As used herein, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, an information handling system may be a computer terminal, a network storage device, or any other suitable device and may vary in size, shape, performance, functionality, and price. The information handling system may include random access memory (RAM), one or more processing resources such as a central processing unit (CPU) or hardware or software control logic, read only memory (ROM), and/or other types of nonvolatile memory. Additional components of the information handling system may include one or more disk drives, one or more network ports for communication with external devices as well as various input and output (I/O) devices, such as a keyboard, a mouse, and a video display. The information handling system may also include one or more buses operable to transmit communications between the various hardware components.

The formation current 134 may be injected into the formation 102 by excitation of the transmitter 130a. In certain embodiments, the system control unit 104 may excite the transmitter 130a by sending a command or a communication signal downhole to the transmitter 130a, the downhole tool 111, a controller associated with the downhole tool 111, or any other suitable downhole tool or component. The command(s) may cause the excitation of the transmitter 130a. In other embodiments, the transmitter 130a is excited by a downhole source located at or associated with the downhole tool 111. In one or more embodiments the source of excitation may be located downhole or at the surface 105. In one or more embodiments, the transmitter 130a may send one or more communication signals to the information handling system. For example, the transmitter 130a may communicate information regarding the time, duration, voltage, current, or any other parameter associated with the excitation of the transmitter 130a.

In certain embodiments, the signal characteristics of the formation current 134 may be based at least in part on at least one downhole characteristics within the borehole 106 and formation 102, including a noise level within the formation 102; a frequency transfer function of the transmitter 130a, the return 130b, and the formation 102; and a frequency response of the target object. The noise level within the formation 102 may be measured downhole using electromagnetic or acoustic receivers coupled to the drilling assembly, for example. The frequency transfer function and the frequency response of the target borehole 103 may be determined based on various mathematical models, or may be extrapolated from previous ranging measurements.

In certain embodiments, the system control unit 104 may further send commands to the any one or more receivers 110 to cause the any one or more receivers 110 to measure the induced magnetic field 136 on the second borehole 103. Like the transmitter 130a, the any one or more receivers 110 may be coupled to a downhole controller, and the commands from the system control unit 104 may control, for example, when the measurements are taken. In certain embodiments, the system control unit 104 may determine and set a sampling rate of the induced magnetic field 136, as will be described below. Additionally, measurements taken by the any one or more receivers 110 may be transmitted to the system control unit 104 via the telemetry system 118. The control unit 104 may determine a distance, orientation and direction to the target object (for example, target well 142 or borehole 103) in the embodiment shown, based at least in part on the measurement of the induced magnetic field 136. For example, the system control unit 104 may use geometric algorithms to determine the distance, orientation and direction of the second borehole 103 relative to the borehole 106.

Figure 2:
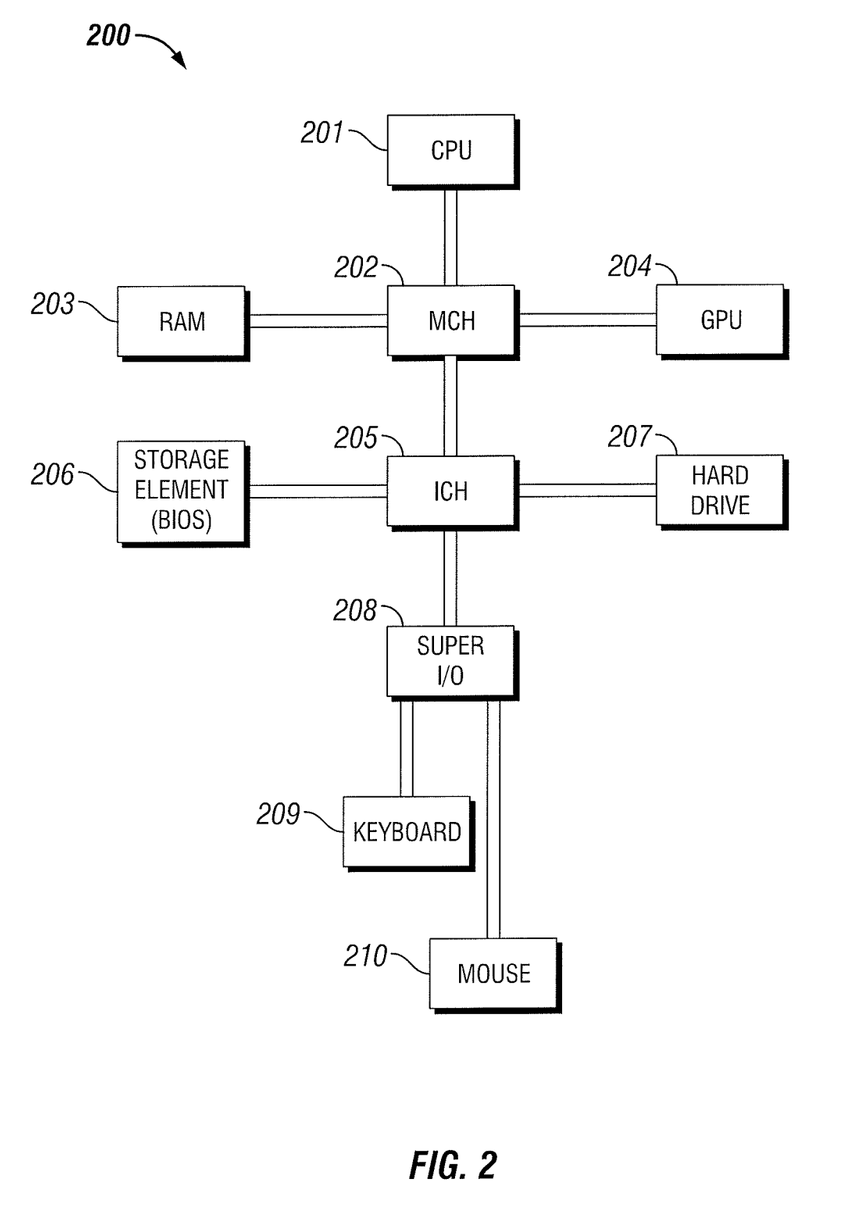
FIG. 2 is a diagram illustrating an example information handling system, according to aspects of the present disclosure.

FIG. 2 is a diagram illustrating an example information handling system 200, according to aspects of the present disclosure. The system control unit 104 may take a form similar to the information handling system 200. A processor or central processing unit (CPU) 201 of the information handling system 200 is communicatively coupled to a memory controller hub or north bridge 202. The processor 201 may include, for example a microprocessor, microcontroller, digital signal processor (DSP), application specific integrated circuit (ASIC), or any other digital or analog circuitry configured to interpret and/or execute program instructions and/or process data. Processor 201 may be configured to interpret and/or execute program instructions or other data retrieved and stored in any memory such as memory 203 or hard drive 207. Program instructions or other data may constitute portions of a software or application for carrying out one or more methods described herein. Memory 203 may include read-only memory (ROM), random access memory (RAM), solid state memory, or disk-based memory. Each memory module may include any system, device or apparatus configured to retain program instructions and/or data for a period of time (for example, computer-readable non-transitory media). For example, instructions from a software or application may be retrieved and stored in memory 203 for execution by processor 201.

Modifications, additions, or omissions may be made to FIG. 2 without departing from the scope of the present disclosure. For example, FIG. 2 shows a particular configuration of components of information handling system 200. However, any suitable configurations of components may be used. For example, components of information handling system 200 may be implemented either as physical or logical components. Furthermore, in some embodiments, functionality associated with components of information handling system 200 may be implemented in special purpose circuits or components. In other embodiments, functionality associated with components of information handling system 200 may be implemented in configurable general purpose circuit or components. For example, components of information handling system 200 may be implemented by configured computer program instructions.

Memory controller hub 202 may include a memory controller for directing information to or from various system memory components within the information handling system 200, such as memory 203, storage element 206, and hard drive 207. The memory controller hub 202 may be coupled to memory 203 and a graphics processing unit 204. Memory controller hub 202 may also be coupled to an I/O controller hub or south bridge 205. I/O hub 205 is coupled to storage elements of the information handling system 200, including a storage element 206, which may comprise a flash ROM that includes a basic input/output system (BIOS) of the computer system. I/O hub 205 is also coupled to the hard drive 207 of the information handling system 200. I/O hub 205 may also be coupled to a Super I/O chip 208, which is itself coupled to several of the I/O ports of the computer system, including keyboard 209 and mouse 210.

In certain embodiments, determining the distance and direction of the second borehole 103 relative to the first borehole 106 may be accomplished using the magnetic fields received by the any one or more receivers 110. In certain embodiments, the distance and direction determination may be achieved utilizing the relationship in Equation (1) between the pipe current and the received magnetic fields.

$$\overline{H} = \frac{I}{2\pi r}\hat{\phi} \qquad \text{Equation (1)}$$

where H is the magnetic field vector, I is the current on the pipe 140, r is the shortest distance between the receiver 110 and the casing 140; and φ is a vector that is perpendicular to both the z-axis of the receiver 110 and the shortest vector that connects the casing 140 to the receiver 110. Although Equation (1) assumes constant casing current along the casing, it can be extended to any current distribution by using the appropriate model.

In certain embodiments, the distance and direction of the second borehole 103 relative to the first borehole 106 may be determined using Equations (2) and (3), respectively.

$$r = \frac{I}{2\pi|\overline{H}|} \qquad \text{Equation (2)}$$

$$\Phi = \text{angle}(\hat{x}\cdot\overline{H}, \hat{y}\cdot\overline{H}) + 90 \qquad \text{Equation (3)}$$

where "·" is the vector inner-product operation. In certain instances, however, Equation (2) may be unreliable if a direct or accurate measurement of I is not possible.

When a direct or accurate measurement of I is difficult or impossible, magnetic field gradient measurement may be utilized for the direction and distance determinations. Spatial change in the magnetic field may be measured in a direction that has a substantial component in the radial (r-axis) direction as in Equation (4).

$$\frac{\partial \overline{H}}{\partial r} = -\frac{I}{2\pi r^2}\hat{\phi} \qquad \text{Equation (4)}$$

where ∂ is the partial derivative. With this gradient measurement available in addition to an absolute measurement, the distance to the second borehole 103 may be calculated using Equation (5).

$$r = \frac{|\overline{H}|}{\left|\frac{\partial \overline{H}}{\partial r}\right|} \qquad \text{Equation (5)}$$

Figure 3:
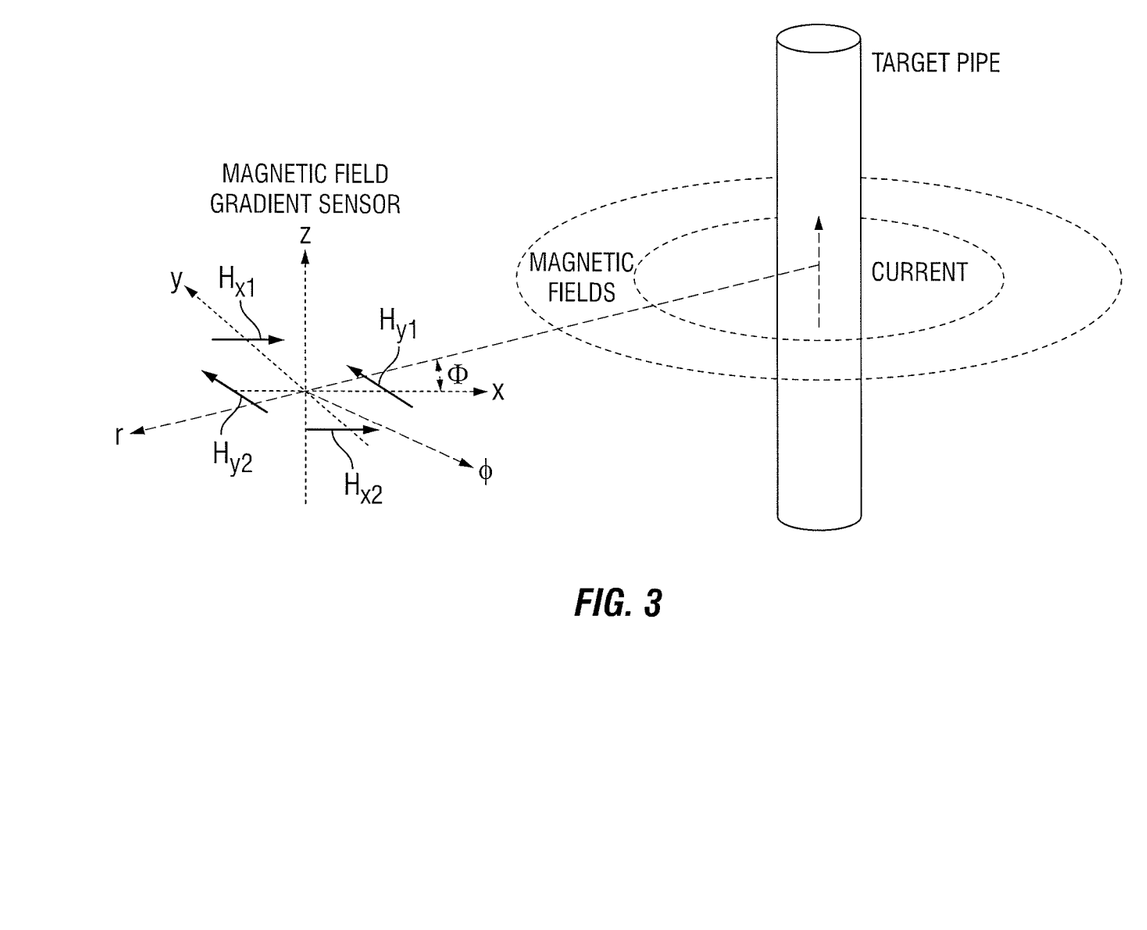
FIG. 3 is a diagram illustrating example gradient measurement components in relation to a target pipe and the magnetic fields produced by currents on the pipe.

In certain embodiments, the gradient field in Equation (5) may be realized in practice by utilizing finite difference of two magnetic field dipole measurements as shown below in Equation (6):

$$r = \frac{H_y}{\frac{H_y\left(x+\frac{\Delta x}{2}, y\right) - H_y\left(x-\frac{\Delta x}{2}, y\right)}{\Delta x}} \qquad \text{Equation (6)}$$

where $H_y$ and the gradient measurement components are illustrated in the 4-dipole configuration of FIG. 3 in relation to a target casing 140 and the magnetic fields produced by currents on the casing 140.

Figures 4B, 4C:
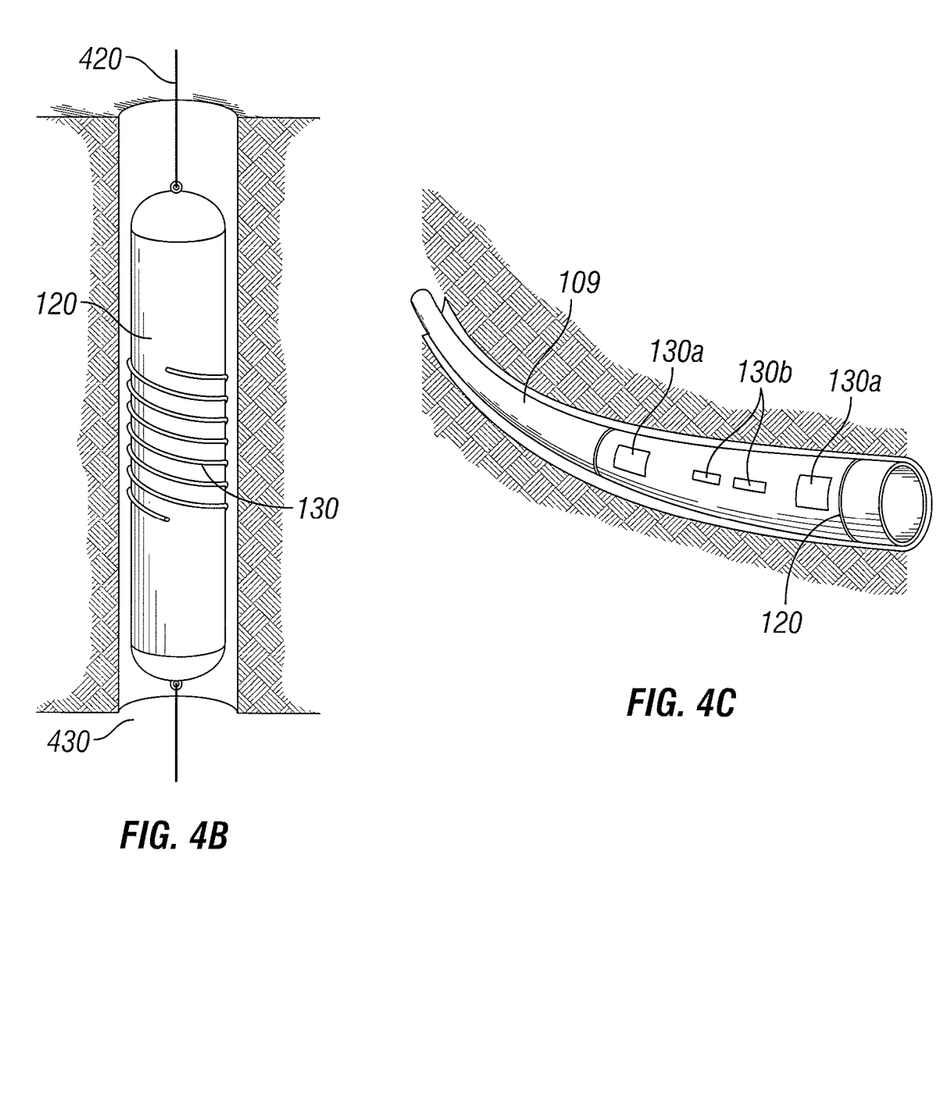

FIG. 4A, FIG. 4B and FIG. 4C are diagrams illustrating an example electromagnetic antenna excitation systems, according to one or more embodiments of the present disclosure.

Although slight variations may exist between different ranging tools that utilize electromagnetic antenna excitation, generally such operate in a similar manner. An electromagnetic antenna is excited with a current or voltage source which causes the current to be emitted from a source electrode (for example, transmitter 130*a*) into the formation 102 through the mud. In general, and especially for loggingwhile-drilling tools, the drill string 108 or the mandrel of the downhole tool 111 (or ranging tool) is preferred to be metallic. A metallic downhole tool 111 increases the structural strength of the drill string 108, enables it to better resist the considerable stress caused by the weight of the drill string 108 and its torque and reduces mechanical failures. However, a metallic structure is electrically highly conductive. Since electrical current prefers to flow in the path of least resistance, the metallic structure itself as opposed to the formation 102 provides a more attractive path to a return 130b. Thus, current emitted into the formation 102 is reduced by the amount of current that is emitted through the metallic structure. To prevent current from flowing through the metallic structure and to force current into the formation 102, insulating gap subs may be inserted in downhole tool 111. Although these gap subs prevent current flow along the metallic structure (for example, along BHA 109 or downhole tool 111), current may short to downhole tool 111 through the mud around the gap sub. Though some current is lost, a significant portion of the current may flow to the formation 102 compared to a configuration without the gap sub.

However, to insert a gap sub, it is necessary to physically separate the downhole tool 111 into multiple pieces and add an insulating material between these separated pieces. The resulting ranging tool or system has a weaker structural strength than a single piece tool without gap subs and may be more prone to mechanical failures. Also, in general, a variety of cables (for example, cables for telemetry and power transfer) run inside the tool and must pass through each gap sub. Accommodating the passage of these cables through each gap sub may present a design challenge as these cables must be fitted inside the gap sub. A higher incidence of failures of the tool or system may arise due to failure of the cables or interconnects that are on or around the gap subs. Difficulties may also be experienced, for example, in the production of a feasible deep ranging tool due to reduced performance or reliability issues.

A ranging tool according present disclosure that includes an electromagnetic antenna excitation system as illustrated in FIG. 4A, FIG. 4B, and FIG. 4C, respectively, is well adapted to attain the ends and advantages of a more reliable, more structurally stable and easier to manufacture ranging tool or mandrel and system as well as those that are inherent therein. FIG. 4A, FIG. 4B, and FIG. 4C each include electromagnetic sources such as electromagnetic antennas 130, insulating layer 120 and a ranging tool which is represented as a casing 430 in FIG. 4A, a wireline tool 420 in FIG. 4B and a BHA 109 or downhole tool 111 in FIG. 4C. While a ranging tool is used throughout, as illustrated in FIG. 4A, the electromagnetic antennas 130 may be painted on a casing or may be painted on a BHA 109, a galvanic tool, a mandrel, or any other type of downhole component according to a particular operation.

Insulating layer 120 comprises insulation that electrically isolates the ranging tool from electromagnetic antennas 130 where the conductive ink electromagnetic antennas 130 is painted on the insulating layer 120 using conductive ink such that the electromagnetic antennas 130 do no contact the ranging tool. For example, the conductive ink of an electromagnetic antenna 130 is disposed on the insulating layer 120 in such a manner, for example, printed, painted, affixed, adhered, applied, or any combination thereof, that the insulating layer 120 conductively isolates the electromagnetic antenna 130 from the ranging tool. Insulating layer 120 provides effective isolation, comparable to that of a gap sub, to prevent direct coupling from electromagnetic antennas 130 to the ranging tool. In one or more embodiments, insulating layer 120 may be printed, painted, affixed, adhered, applied, or any combination thereof to the ranging tool as part of the painting process for the electromagnetic antennas 130. As a result, the amount of current flowing through the ranging tool is reduced while the amount of current reaching the target object is increased. The electromagnetic antennas 130 may include a transmitter 130a and a return 130b. In certain embodiments the number of transmitters 130a and the number of returns 130b are not the same. The designs illustrated in FIG. 4A, FIG. 4B and FIG. 4C may improve the structural strength or integrity and reliability of an electromagnetic antenna excitation system 400 by eliminating the need for gap subs while only increasing costs marginally due to the increased diameter of the ranging tool.

The insulating layer 120 may have insulating properties that prevent contact between the ranging tool and the electromagnetic antennas 130. The insulation provided by the insulating layer 120 prevents current from flowing through the ranging tool when the transmitter 130a is excited resulting in more current flowing into the formation 102. The insulating layer 120 may be of any thickness as required by the specific criteria for a given environment 100 or a given ranging tool. Each insulating layer 120 and electromagnetic antennas 130 may include an opening (for example, a hole or aperture) (not shown) to permit any cables to be fed from the ranging tool through the insulating layer 120 to the electromagnetic antennas 130. For example, a source cable may be fed to the transmitter 130a from the ranging tool through the insulating layer 120 via the opening so as to excite the transmitter 130a. The opening may be only as big as necessary to allow for the cabling. While one of ordinary skill in the art will recognize that the smaller the opening the greater the structural integrity of the ranging tool, the present disclosure contemplates any size opening as necessary for any embodiment. In one or more embodiments, a protective layer may be disposed or applied on the outside of the conductive ink to protect the conductive ink from wearing off when the BHA 109 or tool is subject to one or more drilling effects. This protective layer may be an insulating layer, in which case conductive ink is capacitively coupled to the formation 102.

In certain embodiments, the insulating layer 120 has the same thickness throughout the axial length of the insulating layer 120 while in other embodiments, the insulating layer 120 have a varying thickness throughout the axial length of the insulating layer 120. In one or more embodiments the insulating layer 120 may be disposed at only a portion of the downhole tool sufficient to prevent electrical conductivity between the ranging tool and the electromagnetic antennas 130. In one or more embodiments the insulating layer 120 may cover an entire or partial circumference of the ranging tool. In one or more embodiments, the insulating layer 120 may be disposed on an entire section or the entirety of the ranging tool. For example, as illustrated in FIG. 4A, an insulating layer 120 may cover the entire portion between transmitter 130a and return 130b. As another example, as illustrated in FIG. 4C, the insulating layer 120 may extend the entire range of the electromagnetic antennas 130. In another example, the insulating layer 120 may cover only the portion of the downhole tool where the conductive ink is applied for either the electromagnetic antennas 130. The insulating layer 120 may be disposed on (for example, applied, adhered, or affixed to) the ranging tool according to any specifications of a given operation. In any embodiment, the insulating layers 120 and electromagnetic antennas 130 may be placed at any location along the ranging tool. In certain embodiments, the transmitter 130a is located above the return 130b while in other embodiments, the return 130b is located above the transmitter 130a. While FIGS. 4A and 4B depict electromagnetic antennas 130 and insulating layer 120 being the same size, in certain embodiments, electromagnetic antennas 130 may vary such that transmitter 130a may have a different dimension than return 130b and similarly insulating layer 120a may have a different dimension than insulating layer 120b. In certain embodiments, one or more electromagnetic antennas 130 may be located at the surface 105. For example, one of the returns 130b or the transmitters 130a may be located at the surface 105. In certain embodiments, a plurality of transmitters 130a and a plurality of returns 130b are located at any position along the ranging tool.

As shown in FIG. 4A, in certain embodiment's electromagnetic antennas 130 and insulating layer 120 may each have the same axial length. While axial length for the electromagnetic antennas 130 and insulating layer 120 may be between two and thirty-two inches (between 5.08 and 81.28 centimeters), the present disclosure contemplates any axial length for the electromagnetic antennas 130 and insulating layer 120 as permitted by the design of the electromagnetic antenna excitation system 400. In certain embodiments, the electromagnetic antennas 130 may have a shorter axial length than the insulating layers 120. While FIG. 4A illustrates two insulating layers 120a and 120b, the present disclosure contemplates any number of insulating layers 120. As illustrated in FIG. 4A, the electromagnetic antennas 130 may be applied using conductive ink to a casing 430 within a borehole. The strips of electromagnetic antennas 130 in FIG. 4A may be any thickness and width according to a particular operation or application. For example, the thickness of electromagnetic antenna 130 is a parameter that determines the resistance per unit length of coil. The resistivity of a typical $GaIn_{10}$-based liquid metal alloy is only about 20 times that of copper. A liquid metal painted strip of thickness 1 mm and width of 4 mm will have the same resistance per unit length as a 24 AWG copper wire (0.51 mm diameter). If an 8-fold increase in the resistivity per unit length can be tolerated, the width of the strip may be reduced to 0.5 mm and the same compactness will be achieved.

As shown in FIG. 4B, in certain embodiments, the electromagnetic source is a single winding z-oriented conductive ink tilted coil. Insulating layer 120 is applied to the outer surface of the downhole tool sufficiently to prevent electrical conduction between the tilted coil 130 and the wireline tool 420. The thickness, pitch, winding direction, and number of turns may depend on the particular operation or application. The tilted coil 130 may be employed as a transmitter of magnetic energy, a receiver of magnetic energy or both.

As shown in FIG. 4C, an insulting layer 120 extends axially the full range between transmitters 130a. Electromagnetic antennas 130 are painted or applied on the insulating layer 120 using conductive ink. The insulating layer 120 electrically isolates the electromagnetic antennas 130 from the BHA 109 or downhole tool 111.

Figure 5A:
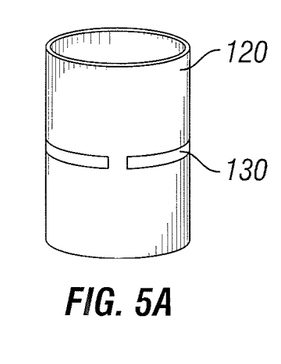
FIGS. 5A, 5B, 5C, 5D and 5E are diagrams illustrating example conductive ink electromagnetic antenna, according to aspects of the present disclosure.
Figure 5B:
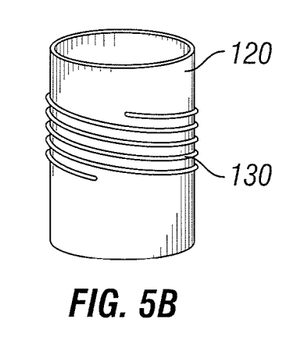
Figure 5C:
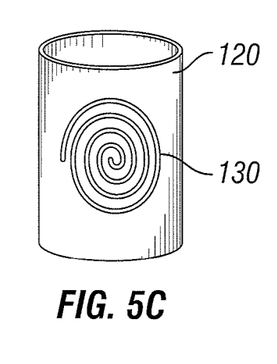
Figure 5D:
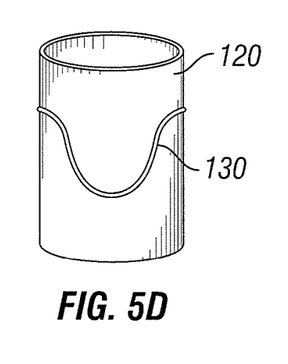
Figure 5E:
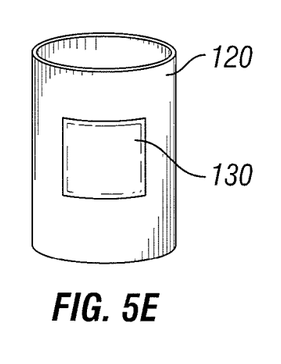

FIGS. 5A through 5E illustrate exemplary conductive ink electromagnetic antennas, according to aspects of the present disclosure. As illustrated in FIGS. 5A through 5E, the conductive ink of electromagnetic antenna 130 may be painted or applied to an insulating layer 120 in any manner suitable for a given operation. In one or more embodiments, any other suitable shape or design may be used. The width and thickness of any of the strips of conductive ink may be any size required for a given operation. FIG. 5A illustrates a conductive ink based single-winding z-oriented coil 130 painted in the shape of a strip on an insulating layer 120. FIG. 5B illustrates a conductive ink based tilted coil 130 painted in the shape of a circulating strip on an insulating layer 120. FIG. 5C illustrates a conductive ink coil printed on the insulating layer 120 with horizontal orientation (symmetry axis perpendicular to that of the ranging tool) in a bullseye type pattern. The separation of the windings may depend on a particular operation. This type of electromagnetic antenna 130 may be useful in designing transmitter coils that create horizontally-directed magnetic fields, or receiver coil that are likewise sensitive. The specific number of turns, orientation, thickness, and pitch of the coil may depend on a particular operation. FIG. 5D illustrates a conductive ink non-planar coil 130 painted on an insulating layer 120 in a sinusoidal pattern. This type of electromagnetic antenna 130 may belong to a general class of non-planar coils (or non-planar antennae) that are increasingly being used in induction applications. FIG. 5E illustrates a conductive ink patch 130 painted on an insulating layer 120.

Figure 6A:
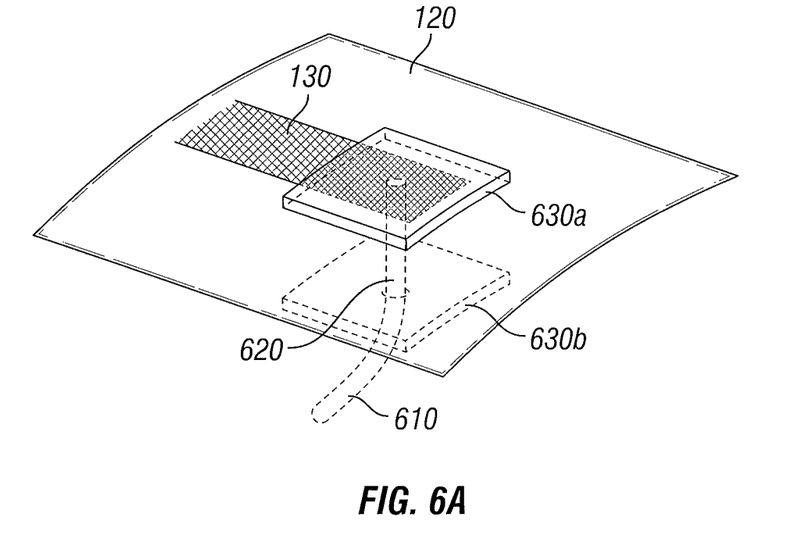
FIGS. 6A and 6B are diagrams illustrating example conductive ink electromagnetic antenna systems, according to aspects of the present disclosure.
Figure 6B:
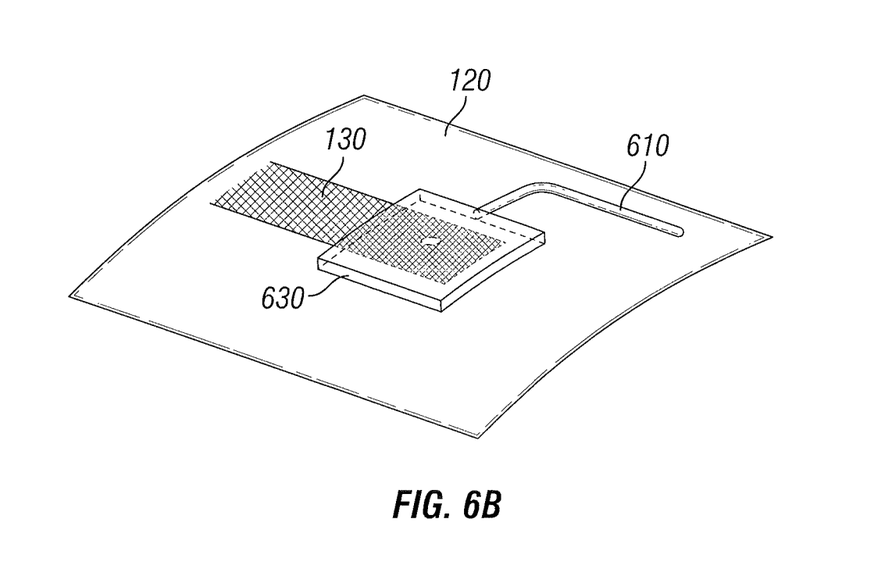

FIG. 6A and FIG. 6B are diagrams illustrating example conductive ink electromagnetic antenna system, according to aspects of the present disclosure. FIG. 6A illustrates a conductive ink painted electromagnetic antenna 130. In one or more embodiments, one or more pins 20 are capped with a top cap 630a and a bottom cap 630b. The pins 620 penetrate through the surface of the ranging tool to provide an electrical connection between the conductive ink of the electromagnetic antenna 130 and any necessary wiring of the ranging tool. The pins 620 are in contact with the terminals of the electromagnetic antenna 130. The top cap 630a provides the electrical connection to the electromagnetic antenna 130 while the bottom cap 630b located on the inside of the ranging tool provides the connection to the wiring 610. The top cap 630a may conform to the shape of the surface of the ranging or structure to preserve compactness and to have a large area of contact with the electromagnetic antenna 130. It may be desirable to have the lateral dimensions of the caps 630 small for reducing the lateral footprint on the ranging tool. The shape and dimensions of the caps 630 may depend on the specific operation. The caps 630 may be metallic caps in one or more embodiments. The pins 620 may be metallic in one or more embodiments. The pins 620 may couple to an electrical interface of the electromagnetic antenna 130 so as to allow for the sending and receiving of information via the wiring 610. The wiring 610 may be installed on the inside of the ranging tool as illustrated in FIG. 6A or along the outside of the ranging tool as illustrated in FIG. 6B. The caps 630 need not cover the entire surface of the electromagnetic antenna 130. In FIG. 6B, only a cap 630 is necessary to connect to the wiring 610. Also, pins 620 are not necessary to couple the electromagnetic antenna 130 to the wiring 610.

Figure 7:
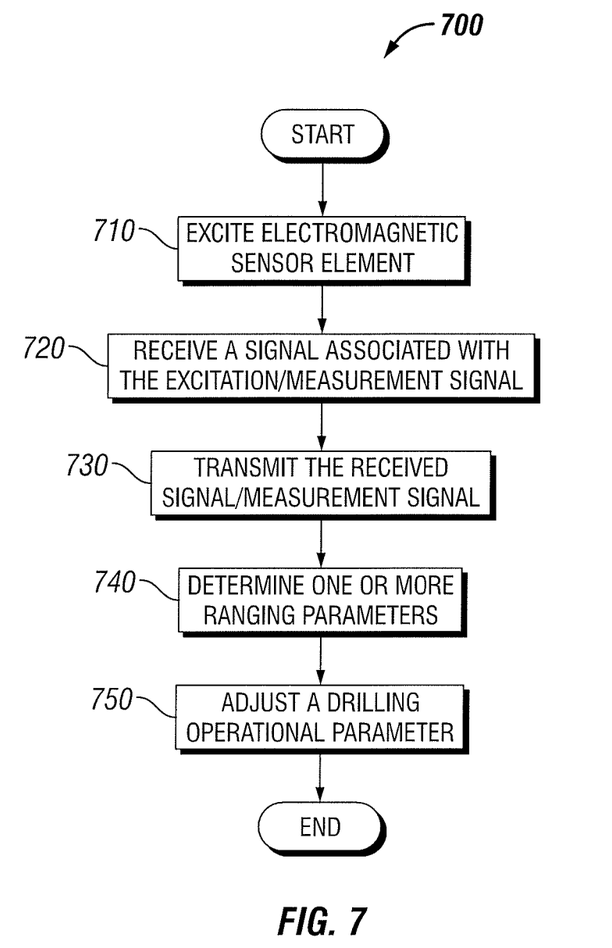
FIG. 7 is a flowchart of a method of exciting an electromagnetic antenna to perform a downhole operation, according to aspects of the present disclosure.

FIG. 7 is a flowchart of a method of exciting an electromagnetic antenna to perform a downhole operation, according to aspects of the present disclosure. At step 710, a transmitter 130a is excited by a source. The source may be located downhole or the source may be located at the surface 105. The source may be controlled via an information handling system 200 (such as system control unit 104 located at the surface 105) or by any other information handling system 200 located at the surface 105, remotely, or downhole. Exciting the electromagnetic antenna 130 causes a formation current 134 to flow into the formation 102. For example, a transmitter 130a may be excited such that formation current 134 is induced into the formation 102 and returned at return 130b.

At step 720 a signal associated with the excitation of the electromagnetic antenna 130, for example, transmitter 130*a*, may be returned at an electromagnetic antenna 130, for example, the return 130*b*. The excitation of the electromagnetic antenna may induce a current, for example, formation current 134, into the formation 102. One or more measurement signals associated with one or more downhole sensors may be received at one or more receivers 110. In one or more embodiments, the one or more measurement signals may be associated with a magnetic field 136 associated with the current induced by the excitation. In one or more embodiments, the one or more measurement signals may comprise information based, at least in part, on a temperature sensor, a humidity sensor, an electrochemical sensor, a vibration sensor, or any other sensor or type of downhole information known to one of ordinary skill in the art. The received signal may be indicative of a measurement of a downhole parameter for example resistivity associated with the mud or the formation 102, formation characteristics, distance to an electromagnetic target, direction to an electromagnetic target, and orientation of an electromagnetic target. The one or more measurements signals or the received signal may be used to determine one or more ranging parameters where the ranging parameters may include direction, distance and orientation to a target such as a target well 142.

At step 730, the one or more measurement signals or the received signal may be transmitted to an information handling system 200 for processing or the one or more measurement signals or the received signal may be processed downhole. At step 730 information about any condition or parameter downhole may also be transmitted as the one or more measurement signals or in lieu of the one or more measurement signals. At step 740, one or more ranging parameters are determined based, at least in part, on the one or more measurement signals.

At step 750 one or more drilling operational parameters are adjusted based, at least in part, on the one or more ranging parameters. The one or more operational parameters may include direction, angle, rotation of drill bit 113, acceleration, speed or velocity of drilling, or any other parameter associated with a given drilling operation. In one or more embodiments, the information handling system 200 may send data to the electromagnetic antenna 130 or any one or more receivers 110 based, at least in part, on any received information (for example, the received signal or the one or more measurement signals) from the electromagnetic antenna 130, receivers 110 or from any other type of surface or downhole sensor. In one or more embodiments, the information handling system 200 sends data to the electromagnetic antenna 130 to alter the collection of information or to alter the excitation. The information handling system 200 may also send information to the drilling assembly 107 to adjust the speed, direction, velocity, acceleration, orientation, or any other operational parameter associated with the drilling assembly 107 of the drilling in the borehole 106. In one or more embodiments, the electromagnetic antenna 130 or the receivers 110 may send and receive one or more communication signals to the information handling system 200. These communication signals may comprise any type of information known to one of ordinary skill in the art including, but not limited, to communications associated with the operational functionality of the electromagnetic antenna 130 or receivers 110, alterations to how the electromagnetic antenna 130 or receivers 110 function, intervals for conducting measurements or transmissions, power saving modes of the electromagnetic antenna 130 and receivers 110, any other type of communication, or any combination thereof.

In one or more embodiments, a method comprises deploying an electromagnetic antenna downhole, inducing a formation current by an excitation from a source, receiving one or more measurements signals, wherein the one or more measurement signals are based, at least in part, on the formation current, sending downhole information to an information handling system, wherein the information is based, at least in part, on the one or more measurement signals, and wherein the electromagnetic antenna comprises at least one of a transmitter or one or more receivers, wherein at least one of the transmitter is excited by the source to induce the formation current or the one or more receivers receive the one or more measurement signals, wherein at least one of the at least one of the transmitter or the one or more receivers comprises conductive ink disposed on one or more insulating layers, and wherein the one or more insulating layers are disposed on an outer surface of a downhole tool. In one or more embodiments, the method further comprises determining a downhole parameter of a formation based, at least in part, on at least one of the one or more measurement signals, wherein the downhole parameter comprises at least one of a formation characteristic, a resistivity of the formation, a distance to an electromagnetic target, a direction to the electromagnetic target, and an orientation of the electromagnetic target. In one or more embodiments, the method further comprises sending a first communication signal to the information handling system or receiving a second communication signal from the information handling system. In one or more embodiments, the conductive ink has a thickness of less than 0.3 millimeters. In one or more embodiments, the conductive ink is tapered at each edge. In one or more embodiments, a protective layer on the outside of the conductive ink protects the conductive ink from wearing off. In one or more embodiments, the downhole tool is a galvanic sensing tool. In one or more embodiments, the conductive ink forms at least one of a patch, a spiral, a sinusoid, a bullseye or a strip. In one or more embodiments, the method further comprises receiving, by a second electromagnetic antenna, a signal from the electromagnetic antenna, wherein the electromagnetic antenna is a transmitter, and wherein the second electromagnetic antenna is a return. In one or more embodiments, the second electromagnetic antenna comprises conductive ink on the surface of the downhole tool. In one or more embodiments, a protective layer covers an outside of the conductive ink of the second electromagnetic antenna. In one or more embodiments, the electromagnetic antenna sends and receives information via an electrical interface with one or more pins between the electromagnetic antenna and a wiring within the downhole tool. In one or more embodiments the one or more pins are metallic. In one or more embodiments, the one or more pins are capped with a top cap at the surface of the downhole tool and a bottom cap within the downhole tool. In one or more embodiments, the top cap and the bottom cap are metallic.

In one or more embodiments, a method comprises exciting a transmitter of the downhole tool using a source, wherein the transmitter comprises conductive ink disposed on one or more insulating layers, wherein the one or more insulating layers are disposed on a surface of the downhole tool, receiving a signal associated with the excitation of the transmitter at a return of the downhole tool, wherein the return comprises conductive ink disposed on at least one of the one or more insulating layers, sending one or more measurement signals from at least one of one or more receivers to an information handling system and adjusting a drilling operational parameter based, at least in part, on at least one of the one or more measurement signals and the received signal. In one or more embodiments, the method further comprises determining a downhole parameter of a formation based, at least in part, on at least one of the one or more measurement signals, wherein the downhole parameter comprises at least one of a formation characteristic, a resistivity of the formation, a distance to an electromagnetic target, a direction to the electromagnetic target, and an orientation of the electromagnetic target. In one or more embodiments, the method further comprises sending, by the transmitter, a first communication signal to the information handling system or receiving, by the transmitter, a second communication signal from the information handling system. In one or more embodiments, the conductive ink of at least one of the transmitter and the return has a thickness of less than 0.3 millimeters. In one or more embodiments, the conductive ink of at least one of the transmitter and the return is tapered at each edge. In one or more embodiments, a protective layer covers an outside of the conductive ink of at least one of the transmitter and the return. In one or more embodiments, the downhole tool is a galvanic sensing tool. In one or more embodiments, the conductive ink of at least one of the transmitter and the return forms at least one of a patch, a spiral, a sinusoid, a bullseye or a strip. In one or more embodiments, the transmitter and the return are communicatively coupled to the downhole tool via an electrical interface with one or more pins, wherein the one or more pins couple the electrical interface to the transmitter and a wiring within the downhole tool and the electrical interface to the return and the wiring. In one or more embodiments, the one or more pins are metallic. In one or more embodiments, the one or more pins are capped with a top cap at the surface of the downhole tool and a bottom cap within the downhole tool.

In one or more embodiments, a wellbore drilling system for drilling in a subsurface earth formation comprises a downhole tool having an insulating layer, an electromagnetic antenna disposed on the insulating layer to electrically isolate the electromagnetic antenna from the downhole tool, wherein the electromagnetic antenna comprises conductive ink, and an information handling system coupled to the downhole tool, the information handling system comprises a processor and a memory coupled to the processor, the memory containing a set of instructions that, when executed by the processor, cause the processor to induce a formation current by an excitation from a source, receive a signal associated with the formation current and determine one or more downhole parameters based, at least in part, on the received signal, wherein the one or more downhole parameters comprise at least one of a distance, direction, or orientation of a conductive target. In one or more embodiments, the set of instructions of the wellbore drilling system for drilling in the subsurface earth formation further cause the processor to send a communication signal to the electromagnetic antenna and receive a communication signal from the electromagnetic antenna. In one or more embodiments, the wellbore drilling system for drilling in the subsurface earth formation further comprises a cap coupled to the electromagnetic antenna and wiring associated with the downhole tool coupled to the cap, wherein the electromagnetic antenna communicates with the information handling system via the wiring. In one or more embodiments, the system for drilling in the subsurface earth formation further comprises a second electromagnetic antenna, wherein the electromagnetic antenna comprises a transmitter and the second electromagnetic antenna comprises a return. In one or more embodiments, the second electromagnetic antenna comprises conductive ink applied to the insulating layer. In one or more embodiments, the system for drilling in the subsurface earth formation further comprises a protective layer that covers an outside of the conductive ink of at least one of the electromagnetic antenna and the second electromagnetic antenna. In one or more embodiments, the electromagnetic antenna comprises one or more receivers, wherein the one or more receivers receive one or more measurement signals associated with the excitation, wherein the signal is received by the information handling system from at least one of the one or more receivers, and wherein the signal is based, at least in part, on the one or more measurement signals.

The particular embodiments disclosed above are illustrative only, as the present disclosure may be modified and practiced in different but equivalent manners apparent to those skilled in the art having the benefit of the teachings herein. Furthermore, no limitations are intended to the details of construction or design herein shown, other than as described in the claims below. It is therefore evident that the particular illustrative embodiments disclosed above may be altered or modified and all such variations are considered within the scope and spirit of the present disclosure. Also, the terms in the claims have their plain, ordinary meaning unless otherwise explicitly and clearly defined by the patentee. The indefinite articles "a" or "an," as used in the claims, are defined herein to mean one or more than one of the element that it introduces.

What is claimed is:

1. A method comprising:
deploying an electromagnetic antenna downhole;
inducing a formation current by an excitation from a source;
receiving one or more measurements signals, wherein the one or more measurement signals are based, at least in part, on the formation current; and
sending downhole information to an information handling system, wherein the information is based, at least in part, on the one or more measurement signals;
wherein the electromagnetic antenna comprises at least one of a transmitter or one or more receivers, wherein at least one of the transmitter is excited by the source to induce the formation current or the one or more receivers receive the one or more measurement signals, wherein at least one of the at least one of the transmitter or the one or more receivers comprises conductive ink disposed on one or more insulating layers, wherein the conductive ink is tapered at each edge, and wherein the one or more insulating layers are disposed on an outer surface of a downhole tool.

2. A method of claim 1, further comprising determining a downhole parameter of a formation based, at least in part, on at least one of the one or more measurement signals, wherein the downhole parameter comprises at least one of a formation characteristic, a resistivity of the formation, a distance to an electromagnetic target, a direction to the electromagnetic target, and an orientation of the electromagnetic target.

3. A method of claim 1, further comprising sending a first communication signal to the information handling system or receiving a second communication signal from the information handling system.

4. The method of claim 1, wherein the conductive ink has a thickness of less than 0.3 millimeters.

5. The method of claim 1, wherein a protective layer on the outside of the conductive ink protects the conductive ink from wearing off.

6. The method of claim 1, wherein the downhole tool is a galvanic sensing tool.

7. The method of claim 1, wherein the conductive ink forms at least one of a patch, a spiral, a sinusoid, a bullseye or a strip.

8. The method of claim 1, further comprising receiving, by a second electromagnetic antenna, a signal from the electromagnetic antenna, wherein the electromagnetic antenna is a transmitter, and wherein the second electromagnetic antenna is a return.

9. The method of claim 8, wherein the second electromagnetic antenna comprises conductive ink on the surface of the downhole tool.

10. The method of claim 9, wherein a protective layer covers an outside of the conductive ink of the second electromagnetic antenna.

11. The method of claim 1, wherein the electromagnetic antenna sends and receives information via an electrical interface with one or more pins between the electromagnetic antenna and a wiring within the downhole tool.

12. The method of claim 11, wherein the one or more pins are metallic.

13. The method of claim 11, wherein the one or more pins are capped with a top cap at the surface of the downhole tool and a bottom cap within the downhole tool.

14. The method of claim 13, wherein the top cap and the bottom cap are metallic.

15. A method comprising:
exciting a transmitter of a downhole tool using a source, wherein the transmitter comprises conductive ink disposed on one or more insulating layers, wherein the one or more insulating layers are disposed on a surface of the downhole tool;
receiving a signal associated with the excitation of the transmitter at a return of the downhole tool, wherein the return comprises conductive ink disposed on at least one of the one or more insulating layers, wherein the conductive ink is tapered at each edge;
sending one or more measurement signals from at least one of one or more receivers to an information handling system; and
adjusting a drilling operational parameter based, at least in part, on at least one of the one or more measurement signals and the received signal.

16. The method of claim 15, further comprising determining a downhole parameter of a formation based, at least in part, on at least one of the one or more measurement signals, wherein the downhole parameter comprises at least one of a formation characteristic, a resistivity of the formation, a distance to an electromagnetic target, a direction to the electromagnetic target, and an orientation of the electromagnetic target.

17. The method of claim 15, further comprising sending, by the transmitter, a first communication signal to the information handling system or receiving, by the transmitter, a second communication signal from the information handling system.

18. The method of claim 15, wherein the conductive ink of at least one of the transmitter and the return has a thickness of less than 0.3 millimeters.

19. The method of claim 15, wherein a protective layer covers an outside of the conductive ink of at least one of the transmitter and the return.

20. The method of claim 15, wherein the downhole tool is a galvanic sensing tool.

21. The method of claim 15, wherein the conductive ink of at least one of the transmitter and the return forms at least one of a patch, a spiral, a sinusoid, a bullseye or a strip.

22. The method of claim 15, wherein the transmitter and the return are communicatively coupled to the downhole tool via an electrical interface with one or more pins, wherein the one or more pins couple the electrical interface to the transmitter and a wiring within the downhole tool and the electrical interface to the return and the wiring.

23. The method of claim 22, wherein the one or more pins are metallic.

24. The method of claim 22, wherein the one or more pins are capped with a top cap at the surface of the downhole tool and a bottom cap within the downhole tool.

25. The method of claim 24, wherein the top cap and the bottom cap are metallic.

26. A wellbore drilling system for drilling in a subsurface earth formation, comprising:
a downhole tool having an insulating layer;
an electromagnetic antenna disposed on the insulating layer to electrically isolate the electromagnetic antenna from the downhole tool, wherein the electromagnetic antenna comprises conductive ink, wherein the conductive ink is tapered at each edge; and
an information handling system coupled to the downhole tool, the information handling system comprises a processor and a memory coupled to the processor, the memory containing a set of instructions that, when executed by the processor, cause the processor to:
induce a formation current by an excitation from a source;
receive a signal associated with the formation current; and
determine one or more downhole parameters based, at least in part, on the received signal, wherein the one or more downhole parameters comprise at least one of a distance, direction, or orientation of a conductive target.

27. The system of claim 26, wherein the set of instructions further cause the processor to:
send a communication signal to the electromagnetic antenna; and
receive a communication signal from the electromagnetic antenna.

28. The system of claim 26, further comprising:
a cap coupled to the electromagnetic antenna; and
wiring associated with the downhole tool coupled to the cap, wherein the electromagnetic antenna communicates with the information handling system via the wiring.

29. The system of claim 26, further comprising a second electromagnetic antenna, wherein the electromagnetic antenna comprises a transmitter and the second electromagnetic antenna comprises a return.

30. The system of claim 29, wherein the second electromagnetic antenna comprises conductive ink applied to the insulating layer.

31. The system of claim 29, further comprising a protective layer that covers an outside of the conductive ink of at least one of the electromagnetic antenna and the second electromagnetic antenna.

32. The system of claim 26, wherein the electromagnetic antenna comprises one or more receivers, wherein the one or more receivers receive one or more measurement signals associated with the excitation, wherein the signal is received by the information handling system from at least one of the one or more receivers, and wherein the signal is based, at least in part, on the one or more measurement signals.

* * * * *